(12) United States Patent
Apisdorf et al.

(10) Patent No.: US 6,950,927 B1
(45) Date of Patent: Sep. 27, 2005

(54) SYSTEM AND METHOD FOR INSTRUCTION-LEVEL PARALLELISM IN A PROGRAMMABLE MULTIPLE NETWORK PROCESSOR ENVIRONMENT

(75) Inventors: Joel Zvi Apisdorf, Reston, VA (US); Sam Brandon Sandbote, Reston, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 618 days.

(21) Appl. No.: 09/833,580

(22) Filed: Apr. 13, 2001

(51) Int. Cl.[7] ............................................... G06F 9/00
(52) U.S. Cl. ....................................... 712/216; 712/235
(58) Field of Search ............................. 712/216, 235, 712/217, 218, 219, 215, 24

(56) References Cited

U.S. PATENT DOCUMENTS

| | | | |
|---|---|---|---|
| 5,640,524 A | * | 6/1997 | Beard et al. ................ 712/222 |
| 6,065,112 A | * | 5/2000 | Kishida et al. ............. 712/221 |
| 6,182,210 B1 | * | 1/2001 | Akkary et al. ............. 712/235 |
| 6,629,233 B1 | * | 9/2003 | Kahle ........................ 712/218 |
| 2001/0023479 A1 | * | 9/2001 | Kimura et al. ............. 712/209 |

* cited by examiner

Primary Examiner—Henry W. H. Tsai
(74) Attorney, Agent, or Firm—John J. Karasek; Joseph T. Grunkemeyer

(57) ABSTRACT

A system and method process data elements with instruction-level parallelism. An instruction buffer holds a first instruction and a second instruction, the first instruction being associated with a first thread, and the second instruction being associated with a second thread. A dependency counter counts satisfaction of dependencies of instructions of the second thread on instructions of the first thread. An instruction control unit is coupled to the instruction buffer and the dependency counter, the instruction control unit increments and decrements the dependency counter according to dependency information included in instructions. An execution switch is coupled to the instruction control unit and the instruction buffer, and the execution switch routes instructions to instruction execution units.

24 Claims, 9 Drawing Sheets

SYSTEM AND METHOD FOR INSTRUCTION-LEVEL PARALLELISM IN A PROGRAMMABLE MULTIPLE NETWORK PROCESSOR ENVIRONMENT

CROSS-REFERENCE TO RELATED APPLICATIONS

The present invention is related to patent applications "System And Method For Processing Overlapping Tasks In A Programmable Network Processor Environment" (Ser. No. 09/833,581) and "System and Method for Data Forwarding in a Programmable Multiple Network Processor Environment" (Ser. No. 09/833,578), both of which are incorporated herein by reference.

BACKGROUND OF THE INVENTION

1. Field of the Invention

The present invention relates generally to digital computing. More specifically, the present invention relates to network processors for processing network data elements.

2. Discussion of the Related Art

Network switches and routers, or network switch elements, form the backbone of digital networks, such as the Internet. Network switch elements connect network segments by receiving network data from ingress network segments and transferring the network data to egress network segments. Because large telecommunications switching facilities and central offices aggregate network traffic from extensive networks and many network segments, they require high-speed and high-availability switches and routers.

Network switch elements select the egress network segment by processing the address or destination included in the network data according to network data processing program logic. Traditionally, network switch elements included Application Specific Integrated Circuits (ASICs) that provided the program logic. Because ASICs are "hard-coded" with program logic for handling network traffic, they provide the high speed necessary to process a large volume of network data. ASICs, however, make it difficult to upgrade or reconfigure a network switch element, and it is expensive to design and fabricate a new ASIC for each new type of network rig switch element.

In response to these drawbacks, manufacturers of network switch elements are turning to programmable network processors to enable network switch elements to process network data. Programmable network processors process network data according to program instructions, or software, stored in a memory. The software allows manufacturers and users to define the functionality of the network switch elements-functionality that can be altered and changed as needed. With programmable network processors, manufacturers and users can change the software to respond to new services quickly, without costly system upgrades, as well as implement new designs quickly.

To the extent that there is a drawback to the use of programmable network processors in network switch elements, that drawback relates to speed. Because programmable network processors process network data using software, they are usually slower than a comparable hard-coded ASIC. One of the major design challenges, therefore, is developing programmable network processors fast enough to process the large volume of network data at large telecommunications switching facilities.

One technique used to increase speed in traditional processor design is "instruction-level parallelism," or processing multiple threads of instructions on a processing element in parallel. However, traditional instruction-level parallelism techniques are either highly complex, or would introduce unacceptable delays and timing problems into the processing of network data, which must be processed on a time critical basis.

SUMMARY OF THE INVENTION

The present invention provides a system and method for processing information using instruction-level parallelism. In the system, an instruction buffer holds a first instruction and a second instruction, the first instruction being associated with a first thread, and the second instruction being associated with a second thread. In this system, one or more instructions from the second thread may be dependent on the execution of one or more instructions in the first thread. A dependency counter is used to record dependencies of instructions between the first thread and the second thread. An instruction control unit is coupled to the instruction buffer and the dependency counter, the instruction control unit increments and decrements the dependency counter on the basis of information in the instructions. An execution switch is coupled to the instruction control unit and the instruction buffer, the execution switch sends instructions to an execution unit.

In the method, a first instruction associated with a first thread is loaded on a processing element. The processing element determines that execution of a second instruction depends on the execution of the first instruction, where the second instruction is associated with a second thread. A dependency counter associated with the second thread is incremented if the processing element determines that execution of a second instruction depends on the execution of the first instruction.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
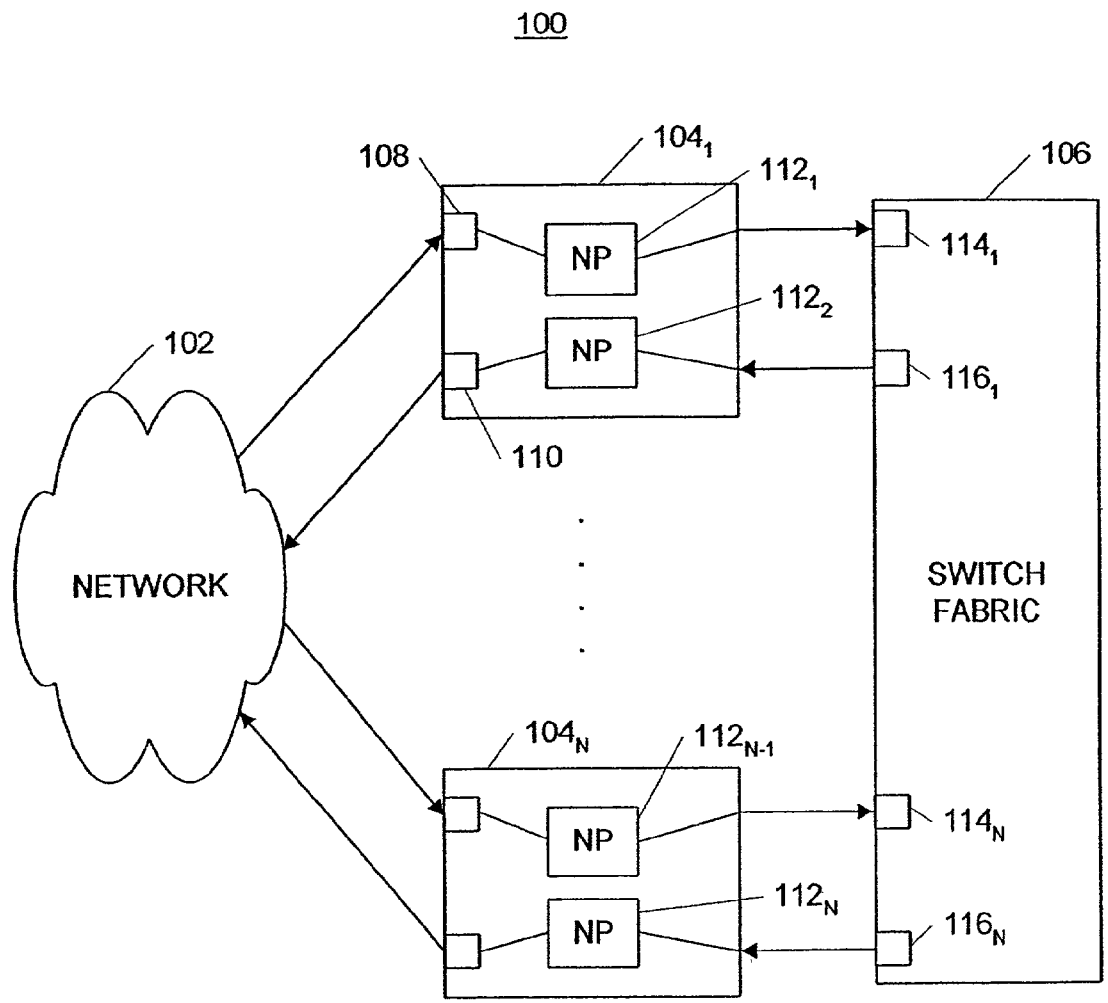
FIG. 1 illustrates a system block diagram of a data communications system.

Exemplary embodiments of the invention are discussed in detail below. While specific implementations are discussed, it should be understood that this is done for illustrative purposes only. A person skilled in the relevant art will recognize that other components and configurations may be used without parting from the spirit and scope of the invention.

Programmable network processors offer a number of advantages including flexibility, low cost, maintenance ease, decreased time to market, and increased service life. It is difficult, however, to develop a programmable network processor capable of meeting the demand for ever-increasing speed. One technique for increasing the speed of a programmable network processor is instruction-level parallelism. In instruction-level parallelism, threads of parallel programs can execute concurrently on a single processing element. Instruction-level parallelism allows a processing element to continue processing instructions, even if one or more threads are waiting for long-latency operations to complete.

One problem with instruction-level parallelism is maintaining synchronization of dependent instructions between the threads running on a processing element. Often, an instruction in one thread is dependent on the execution of instructions in another thread. Examples of instruction dependency are control dependency (i.e., the execution of one instruction is conditioned on the execution of another) and data dependency (i.e., one instruction uses the results of the execution of another instruction). Unfortunately, conventional techniques for synchronizing the execution of instructions among multiple threads do not lend themselves to programmable network processor applications. Conventional techniques introduce significant delays to processing, delays that are unsuitable for processing time critical network data elements.

The present invention is directed to a system and method for synchronizing the execution of multiple threads of instructions on a single processing element at high speed. An instruction in a first thread can include dependence indicators, such as a bit or bits, that indicate dependence of the instruction on the execution of a second thread. When a processing element encounters an instruction that includes dependence indicators that indicate dependence between threads, the processing element checks, decrements, or increments one or more dependency counters that record satisfaction of dependencies between instructions and threads. If a dependency indicator indicates that an instruction in a first thread is dependent upon the execution of a second thread, a dependency counter is checked. If the dependency counter is not above a threshold, the processing element suspends the execution of the first thread until the dependency counter is incremented by a second thread to above the threshold. This allows the processing element to maintain synchronized execution of dependent instructions between threads in a highly efficient manner. It should be recognized that the concepts described below are not restricted to processing network data elements but are extensible to a generic form of data processing. Prior to discussing the features of the present invention, a brief description of a data communications system is provided.

FIG. 1 illustrates a block diagram of a network data communications system, according to an embodiment of the present invention. Data communications system 100 can be, for example, of the type used by network service providers and telecommunication carriers to provide voice and data communications services to consumers. Data communications system 100 includes network 102, network line modules 104$_1$–104$_N$, and switch fabric 106. Note that a subscript "N" in the figures denotes a plurality of elements generally, and not a specific number or equality of number between different elements with a subscript "N."

Network 102 is connected to network line modules 104$_1$–104$_N$ which, in turn, are connected to switch fabric 106. Although data communications system 100 is shown as including physical connections between the various components, other configurations are possible, such as wireless connections. Connections between network 102, network line modules 104$_1$–104$_N$, and switch fabric 106 can be, for example, wireless data connections, data over copper, fiber optic connections (e.g., OC-48, OC-192, OC-768), or other data communications connections as would be apparent.

Network line modules 104$_1$–104$_N$ send and receive network data elements to (from) network 102. Network line modules 104$_1$–104$_N$ process the network data elements and communicate the process network data elements with switch fabric 106. Network data elements are signals carrying information including communications information. Examples of network data elements are asynchronous transfer mode ("ATM") cells, Frame Relay frames, Internet Protocol ("IP") packets, etc., and portions (segments) of these. Processing includes the concepts of performing a calculation or manipulation involving a network data element. Processing can include, for example, determining the next hop or egress port to which the network data element Star should be routed, network management, such as traffic shaping or policing, network monitoring, etc. Network 102 is a network for communicating network data elements. Network 102 can be, for example, the Internet, a telecommunications data network, an intranet, an extranet, a voice over data communications network, etc., and combinations thereof.

For descriptive clarity, operation of data communication system 100 is described in terms of network line module 104$_1$. Network line module 104$_1$ includes network line module ingress port 108, network line module egress port 110, and programmable network processors 112$_1$–112$_2$. Note that the configuration of network line modules 104$_1$–104$_N$ is shown for illustrative purposes only, and alternate configurations for network line modules 104$_1$–104$_N$ are possible. Alternate configurations include, for example, single or additional programmable network processors per network line module, additional network line module ingress ports, multiple egress ports, additional connections to network 102, etc.

Network line module 104$_1$ receives network data elements from network 102 at network line module ingress port 108. Programmable network processor 112$_1$ receives network data elements from network line module ingress port 108. Programmable network processor 112 enables network line module 104$_1$ to process the received network data elements. Programmable network processor 112$_1$ provides the network data elements to switch fabric 106 after processing.

Switch fabric 106 includes switch fabric ingress ports 114$_1$–114$_N$ and switch fabric egress ports 116$_1$–116$_N$. Switch fabric ingress ports 114$_1$–114$_N$ receive data from network line modules 104$_1$–104$_N$ and switch fabric egress ports 116$_1$–116$_N$ ports provide data to network line modules 104$_1$–104$_N$. Switch fabric 106 outputs network data elements received from network processor 112$_1$ on the desired switch fabric egress port 116$_1$–116$_N$. Network line module 104$_1$ receives processed network data elements from switch fabric egress port $116_1$ and performs additional processing, as required, and transmits the network data element to network 102 via network line module egress port 110. Note that network line module ingress port 108, network element egress port 110, switch fabric ingress ports $114_1$–$114_N$, and switch fabric egress ports $116_1$–$116_N$ are logical representations of physical devices, and other combinations, such as single ports that transmit and receive network data elements, are possible.

Figure 2:
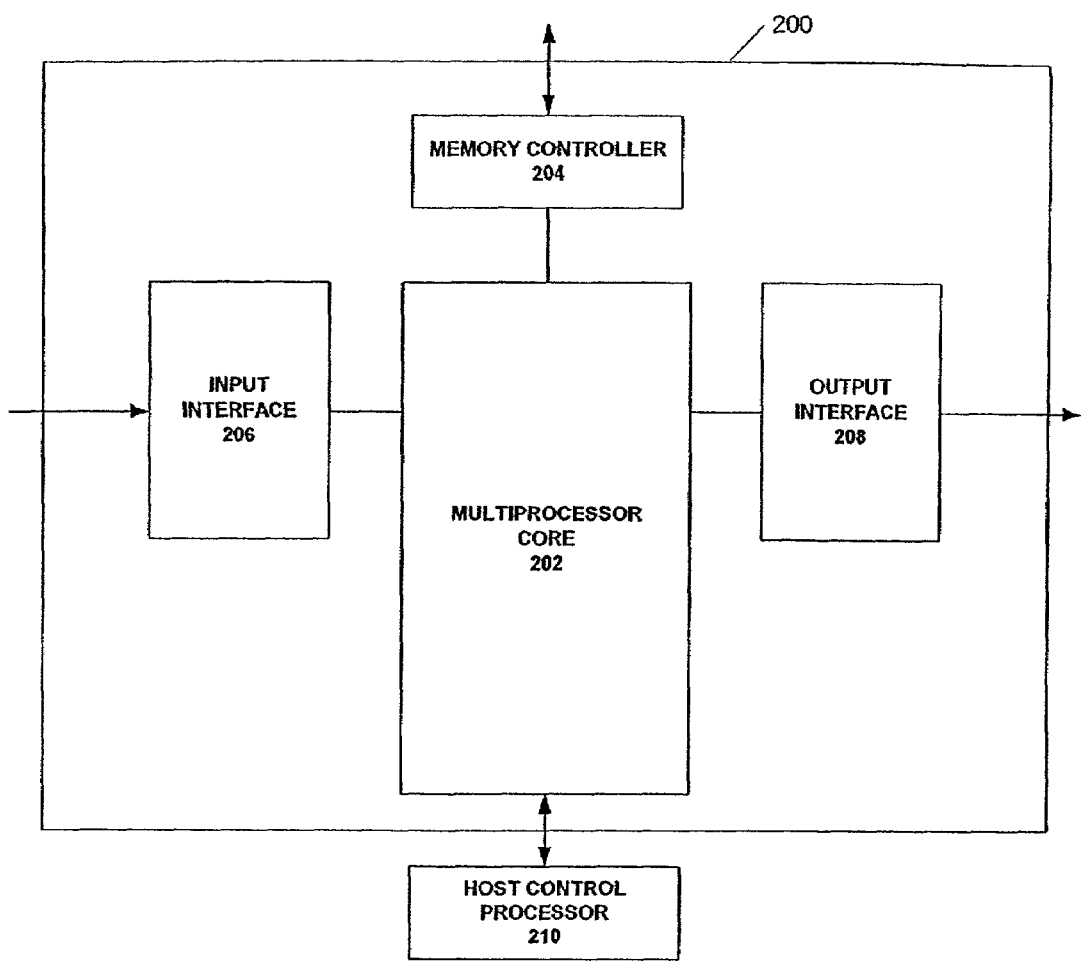
FIG. 2 illustrates a system block diagram of a programmable network processor.

FIG. 2 illustrates a system block diagram of a programmable network processor, according to an embodiment of the present invention. Programmable network processor 200 can be considered an exemplary embodiment of both ingress and egress programmable network processors $112_1$–$112_N$, as described above. Programmable network processor 200 includes memory controller 204, input interface 206, multiprocessor core 202, and output interface 208. Multiprocessor core 202 is connected to input interface 206, output interface 208, and memory controller 204. Note that the particular configuration, number, and type of elements of programmable processor 200 are shown for illustrative purposes only and other configurations of programmable network processor 200 are possible as would be apparent.

For the purposes of this description, it is presumed that the programmable network processor 200 of FIG. 2 corresponds to programmable network processor $112_1$. In operation, such a programmable network processor 200 receives network data elements from network line module ingress port 108 via input interface 206. Input interface 206 receives the network data elements and provides them to multiprocessor core 202 for processing as described above. Multiprocessor core 202 processes the network data elements and provides the result to output interface 208. Output interface 208 receives processed network data elements from multiprocessor core 202 and forwards them to switch fabric 106 for routing. Multiprocessor core 202 accesses storage located off programmable network processor 200 via memory controller 204.

Multiprocessor core 202 is connected to host control processor 210. Host control processor 210 provides network management logic and information for programmable network processor 200. Such network management logic and information includes, for example, generating and receiving network data elements for controlling switch fabric 106, network line modules $104_1$–$104_N$ and other network components. Host control processor 210 performs other functions, such as generating network data elements for switch fabric control, setting up network connections and loading programs into multiprocessor core 202 for operation.

Figure 3:
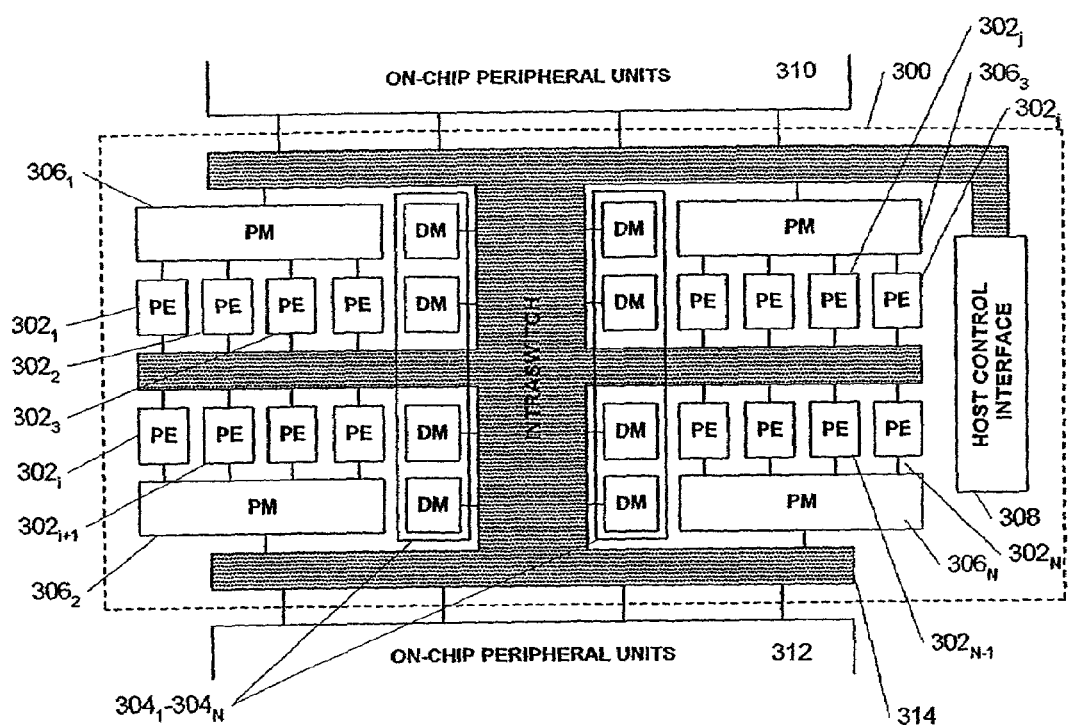
FIG. 3 illustrates a system block diagram of a multiprocessor core.

FIG. 3 illustrates a system block diagram of a multiprocessor core, according to an embodiment of the present invention. Multiprocessor core 300 is an exemplary embodiment of multiprocessor core 202, as described above. Although multiprocessor core 300 can be used for a generic form of data processing, multiprocessor core 300 can also be of the type employed in data communications system 100. Multiprocessor core 300 includes processing elements (PE) $302_1$–$302_N$, data memories (DM) $304_1$–$304_N$, program memories (PM) $306_1$–$306_N$, intraswitch 314, and host control interface 308. Processing elements $302_1$–$302_N$ are connected to program memories $306_1$–$306_N$, and intraswitch 314. Data memories $304_1$–$304_N$ are connected to intraswitch 314. Program memories $306_1$–$306_N$ are connected to processing elements $302_1$–$302_N$ and intraswitch 314. Host control interface 308 is connected to intraswitch 314. Intraswitch 314 is connected to on-chip peripheral units 310 and 312. Examples of on-chip peripheral units 310 and 312 are input interface 206, output interface 208, and memory controller 204 of FIG. 2.

Processing elements $302_1$–$302_N$ process network data elements, thereby providing the processing functionality for multiprocessor core 300. Processing elements $302_1$–$302_N$ execute program instructions from program memories $306_1$–$306_N$, and load and store data in data memories $304_1$–$304_N$. Each of processing elements $302_1$–$302_N$ can process multiple threads of instructions concurrently, according to an embodiment of the present invention.

Program memories $306_1$–$306_N$ and data memories $304_1$–$304_N$ provide data storage functionality for the various elements of multiprocessor core 300. Program memories $306_1$–$306_N$ store program instructions for the processing of network data elements by processing elements $302_1$–$302_N$. Although FIG. 3 depicts groups of four processing elements directly connected to one of program memories $306_1$–$306_N$, other configurations connecting program memory to processing elements are possible, including for example, additional processing elements or program memories as would be apparent. Data memories $304_1$–$304_N$ provide on-chip storage for data, such as intermediate-results data from processing network data elements, for the operation of processing elements $302_1$–$302_N$.

Intraswitch 314 enables communication between the various components of multiprocessor core 300. For example, processing elements $302_1$–$302_N$ access data memories $304_1$–$304_N$ through intraswitch 314. Intraswitch 314 can be, for example, a switching fabric in multiprocessor core 300, or individual trace connections in multiprocessor core 300. Host control interface 308 connects multiprocessor core 300 to host control processor 210. Multiprocessor core 300 is connected to on-chip peripheral units 310 and 312 via intraswitch 314.

In operation, multiprocessor core 300 receives network data elements from on-chip peripheral units 310 and 312. Processing elements $302_1$–$302_N$ receive the network data elements and process them according to the programs stored as instructions in program memories $306_1$–$306_N$. The intermediate results and final results of the processing operations are stored in data memories $304_1$–$304_N$. After a network data element has been processed, it is sent to on-chip peripheral unit 310 and 312.

Figure 4:
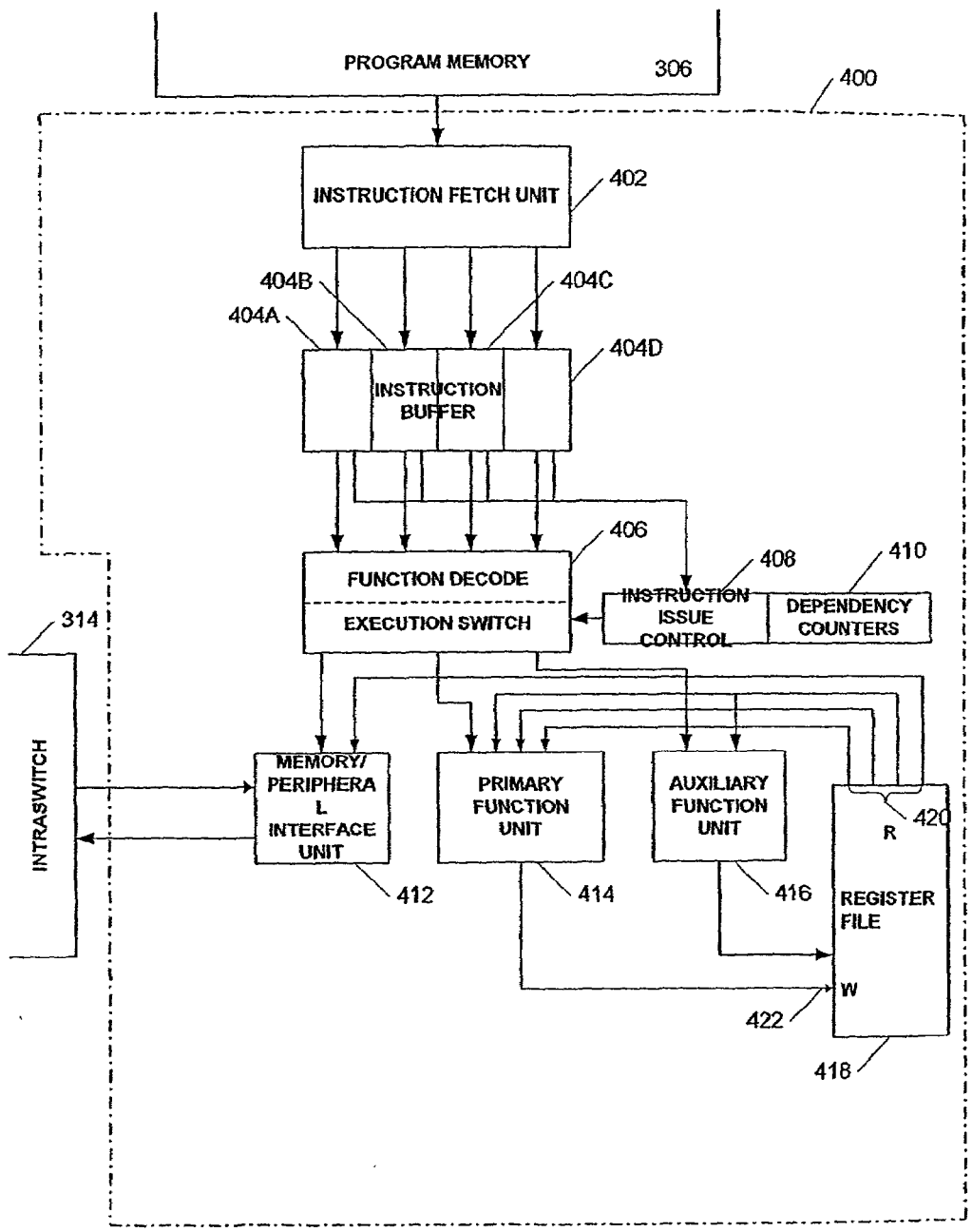
FIG. 4 illustrates a system block diagram of an exemplary processing element.

FIG. 4 illustrates a system block diagram of an exemplary processing element, according to an embodiment of the present invention. Processing element 400 is an example of one of the processing elements shown in FIG. 3, and can be employed in a generic form of data processing or can be of the type that is employed in data communications system 100.

Moreover, exemplary processing element 400 is an instruction-level parallel processing element, in which two or more threads of parallel programs execute concurrently. Processing element 400 can, therefore, maintain a high utilization under conditions where the processing element would otherwise idle waiting for long-latency operations to complete. Note that processing element 400 is provided for illustrative purposes only and that other processing element configurations are possible.

Processing element 400 includes instruction fetch unit 402, instruction buffers 404A, 404B, 404C, and 404D. Processing element 400 also includes function decode and execution switch 406, dependency counters 410, instruction issue control 408, memory/peripheral interface unit 4; 2, primary function unit 414, auxiliary function unit 416, and register file 418. Note that although dependency counters 410 are shown as being part of instruction issue control 408, other configurations are possible. For example, dependency counters 410 can also be connected to, but not part of, instruction issue control 408.

Instruction fetch unit 402 is connected to each of instruction buffers 404A–404D. Each of the connections between fetch unit 402 and instruction buffers 404A–404D provides a path for instructions from a program thread. Instruction buffers 404A–404D are, in turn, connected to function decode and execution switch 406. Instruction buffers 404A–404D are also connected to instruction issue control 408. Instruction issue control 408 is connected to function decode and execution switch 406. Function decode and execution switch 406 is connected to memory peripheral interface unit 412, primary function unit 414, and auxiliary function unit 416. Memory peripheral interface unit 412, primary function unit 414, and auxiliary function unit 416 are also referred to herein as execution units 412–416. Memory peripheral interface unit is connected to intraswitch 314, and register file 418. Primary function unit 414 is connected to register file 418. Auxiliary function unit 416 is connected to register file 418.

Register file 418 includes read ports 420 and write port 422. Read ports 420 allow execution units 412–416 to read data from the various registers in register file 418. Write port 422 allows execution units 412–416 to write data to register file 418.

Exemplary processing element 400 is shown as supporting four concurrent threads of instructions. Instruction fetch unit 402 fetches instructions from program memory 306. The instructions are entered in the four instruction buffers 404A–404D according to the program thread they belong to. Each of instruction buffers 404A–404D is associated with one of four threads. For descriptive clarity, the convention of associating thread 0 (T0) with instruction buffer 404A, thread 1 (T1) with instruction buffer 404B, thread 2 (T2) with instruction buffer 404C, and thread 3 (T3) with instruction buffer 404D is adopted.

Function decode and execution switch 406 receives the instructions associated with the four threads from instruction buffers 404A–404D. Function decode and execution switch 406 provides the instructions to execution units 412–416.

Figure 5:
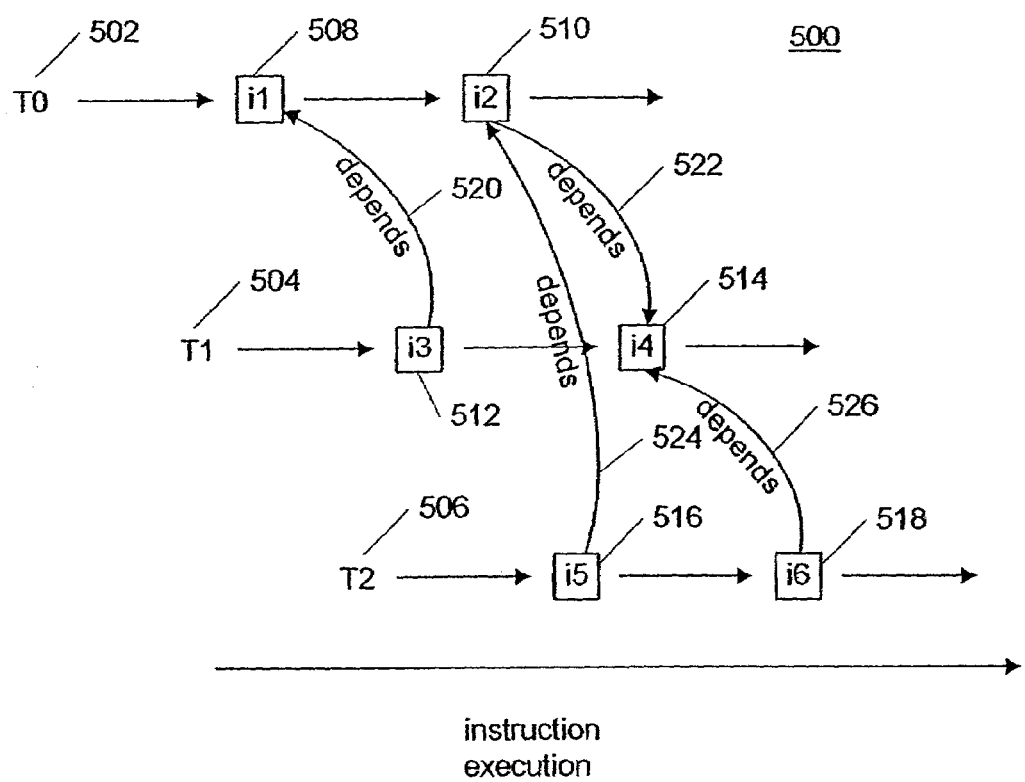
FIG. 5 is a diagram illustrating concurrent processing of three threads of instructions.

FIG. 5 is a diagram illustrating concurrent processing of three threads of instructions. Instruction processing diagram 500 illustrates the problem of instruction synchronization between multiple threads. The instructions of one thread can be dependent on the results of instructions in another thread. For example, the contents of a register that is set by a first instruction in one thread can be used by a second instruction in another thread. In such a case, if the first instruction is not executed before the second instruction, the register will not include data valid for the execution of the first instruction. These types of problems are referred to as synchronization problems, and may result in a program execution error.

Instruction processing diagram 500 shows three threads of instructions, thread 502, thread 504, and thread 506. Threads 502–506 can be of the type employed in a generic form of data processing or can be of the type that are employed in data communications system 100. Note that three threads are shown for descriptive clarity only, and other configurations are possible. A processing element can process as few as two threads, and as many threads as is accommodated by a processing element architecture. For example, processing element 400 accommodates four concurrent threads of instructions.

Each of threads 502–506 is shown including two instructions. Thread 502 includes instruction 508 (i1) and instruction 510 (i2). Thread 504 includes instruction 512 (i3) and instruction 514 (i4). Thread 506 includes instruction 516 (i5) and instruction 518 (i6). Note that instruction processing diagram 500 shows two instructions per thread for descriptive clarity only, and other configurations are possible. For example, each of threads 502–506 can include additional instructions (not shown) before the first instruction (e.g., instruction 508 in thread 502), between the first and second instruction (e.g., instructions 508 and 510 in thread 502), and after the second instruction (e.g., instruction 510 in thread 502). Threads 502–506 can include as many instructions as are required to perform generic data processing or perform processing for data communications system 100.

Generally, a processing element processes the three threads by executing their respective instructions. Instruction processing diagram 500 shows instruction execution proceeding from left to right, and the relative spacing of instructions indicates when an instruction is being executed. For example, instruction processing diagram 500 shows instruction 508 is executed before instruction 510 of thread 502. Note also the chronological relationships between instructions of different threads. For example, the processing element executes instruction 508 of thread 502 before instruction 512 of thread 504, and instruction 512 before instruction 516 of thread 506.

Additionally, instruction processing diagram 500 shows the dependency between the instructions of threads 502–506. Dependency is when the execution of a second instruction is conditional on the execution of a first instruction. Consider, for example, a situation in which a first instruction in a first thread writes a value to a register file, such as register file 418, and a second instruction in a second thread subsequently reads the value from the register file and uses the value as an operand in a calculation. In this situation, the first instruction is referred to as the dependee instruction, and the second instruction is referred to as the dependent instruction. A dependent instruction is an instruction that must not be executed before the instruction on which it depends. A dependee instruction is an instruction on which a dependent instruction depends. As long as the dependee instruction is executed before the dependent instruction, the register file includes the correct value for the execution of the dependent instruction.

Depends indicators 520–526 are used to show dependencies between the instructions of threads 502–506. Depends indicators are drawn from a dependent instruction to a dependee instruction (i.e., the arrow of the depends indicator points to the dependee instruction). Depends indicator 520 indicates that the execution of instruction 512 depends on the execution of instruction 508. Depends indicator 522 indicates that the execution of instruction of 510 depends on the execution of instruction 514. Depends indicator 524 indicates that the execution of instruction 516 depends on the execution of instruction 510. Depends indicator 526 indicates that the execution of instruction 518 is dependent on the execution of instruction 514.

As described above, if a first instruction depends on a second, earlier executed, instruction, processing may proceed normally. Instruction processing diagram 500 shows instruction 512 and instruction 516 dependent on earlier executed instructions. Program errors may occur, however, if a first instruction depends on a later executed instruction. Instruction processing diagram 500 shows the synchronization problem as instruction 510 depending on a later executed instruction. As such, it is important for a processing element to synchronize the execution order of dependent and dependee instructions between threads to avoid such program errors.

The present invention provides a system and method that maintains the order of instruction execution between threads. Generally, a processing element processes multiple threads of instructions. Instructions in the threads can include dependence indicators that indicate dependencies between instructions and threads. When the processing element encounters instructions that include dependence indicators identifying a dependent instruction or thread, it checks, decrements, or increments one or more dependency counters. If the dependency counter is not above a threshold, it indicates that a dependency has not been satisfied, and the processing element can suspend the execution of a thread until the dependency counter is incremented to above the threshold. This allows the processing element to maintain a form of synchronized execution of dependent instructions between threads.

In one embodiment, instructions can include the dependence indicators as bits, called "depends" bits and "tells" bits. A depends bit is an indicator in a dependent instruction that a particular other thread includes an instruction on which this one depends. A tells bit is an indicator in a dependee instruction that a particular other thread includes an instruction dependent on this one. The additional bits can be included with the instruction in a number of ways. For example, a compiler for instruction-level parallel processors can include the bits at compile time based on dependencies, or a programmer may specify the instruction execution order by including "depends" and "tells" bits when coding, etc.

An exemplary embodiment is described herein to provide context for discussion, and the present invention encompasses other embodiments, as are described further below. Consider an exemplary processing element processing four threads of instructions. Each of the instructions in the four threads can include depends bits and tells bits. In an exemplary embodiment each instruction in a thread can include three depends bits, each of which indicates that the instruction is dependent on one of the other three threads. Similarly, each instruction in a thread can include three tells bits, each of which indicates that one of the other three threads depends on the execution of the instruction.

In the exemplary embodiment, the processing element can include four groups of dependency counters, each of which is associated with one of the four threads. Each of the groups of dependency counters includes three individual dependency counters, each of which is associated with one of the other three threads. For instance, consider four exemplary threads, thread 0, thread 1, thread 2, and thread 3, each having an associated group of dependency counters. The exemplary group of dependency counters associated with thread 0 includes three individual dependency counters, each of which is associated with one of thread 1, thread 2, or thread 3.

In operation, the exemplary processing element processes the instructions of the four threads. When the exemplary processing element encounters an instruction in a first thread that includes a tells bit identifying a second thread (i.e., one of the other three threads), the exemplary processing element increments the dependency counter associated with the first thread of the group of dependency counters associated with the second thread.

When the exemplary processing element processes an instruction in a first thread that includes a depends bit identifying a second thread, the processing element checks the dependency counter associated with the second thread of the group of dependency counters associated with the first thread to determine whether the instruction can be executed. If the value of the exemplary dependency counter is above a threshold (e.g., non-zero), the processing element executes the instruction. If, on the other hand, the value of the exemplary dependency counter is below a threshold, processing of the first thread is inhibited. The processing element increments the dependency counter when instructions including tells bits in the second thread are executed, and processing the first thread is resumed once the dependency counter is above the threshold. Note that an instruction can include multiple dependency indicators, such as one or more tells bits in combination with one or more depends bits. When an instruction includes more than one depends bit, the associated dependency counters must be above the threshold before the instruction is executed.

The threshold is a dependency counter value chosen to ensure that dependent instructions are not executed before the instructions in other threads on which they depend. The threshold value can be set to ensure correct instruction level synchronization. For example, the threshold can be chosen to be zero, so that a dependency counter must be incremented before a dependent instruction can be executed, as is described in further detail, below. Network data element processing is often repetitive and predictable. As such, a programmer, or compiler, can determine that value at which the threshold can be set. Note that although one embodiment of the present invention is explained in terms of a "threshold," "above a threshold," and "not above a threshold," other configurations that record dependency between instructions and threads are possible. For example, in an alternate embodiment, the processing element can suspend processing a thread if a dependency counter falls below a threshold.

According to an embodiment of the present invention, depends bits, tells bits, and dependency counters are used to record the satisfaction of dependencies between instructions in a first thread and the processing of a second thread. This is in contrast to instruction processing diagram 500 of FIG. 5 that shows dependencies between individual instructions. It is sufficient to record dependency at this level because the present invention provides a system and method that ensures that dependent instructions are executed after the instructions on which they depend.

Consider, for example, the application of "depends" bits and "tells" bits to instruction processing diagram 500 of FIG. 5. In this example, instruction 512 would include a depends bit identifying instruction 512 as dependent upon instructions in thread 502. In one embodiment, the depends bit identifies the thread that includes the instruction on which instruction 512 is dependent, which is, in this case, thread 502. In another embodiment, the depends bits can identify the type or particular one of the instructions in thread 502. For example, the instruction can include more bits (i.e., more information) that identify instruction characteristics (such as type, priority, etc.). For descriptive clarity, however, depends bits and tells bits are described herein as identifying threads, and not instructions. As such, instruction 508 would include a tells bit that identifies thread 504 as including an instruction or instructions that are dependent upon the execution of instruction 508.

Similarly, instruction 510 would include a tells bit identifying thread 506 as including instructions dependent upon the execution of instruction 510. Instruction 510 would also include a depends bit identifying instruction 510 as dependent on the execution of instructions in thread 504. Instruction 514 would include a tells bit identifying thread 502 as including instructions that are dependent on the execution of instruction 514. Instruction 514 also would include a tells bit identifying thread 506 as including instructions dependent on the execution of instruction 514. Instruction 516 would include a bit identifying instruction 516 as dependent on instructions in thread 502. Instruction 518 would include a depends bit identifying instruction 518 as dependent on the execution of instructions in thread 504.

Figure 8:
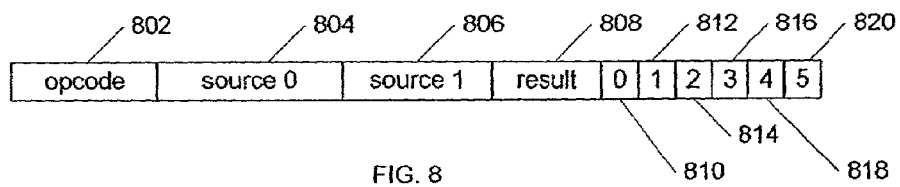
FIG. 8 illustrates an exemplary instruction.

FIG. 8 illustrates an exemplary instruction, according to an embodiment of the present invention. Instruction 800 includes opcode 802, source 0804, source 1806, result 808, depends bit 810, depends bit 812, depends bit 814, tells bit 816, tells bit 818, and tells bit 820. Opcode 802 is the operator for instruction 800. Source 0804 specifies a first operand operated upon by opcode 802. Source 1806 specifies a second operand operated upon by opcode 802. Result 808 identifies a register to which the results of opcode 1302 are stored.

Depends bits 810–814 indicate that instruction 800 depends upon the execution of instructions in other threads. Instruction 800 is configured for a processing element that supports the operation of four threads. Note that although instruction 800 includes three depends bits which identify three other threads, and three tells bits, which also identify three other threads, other configurations are possible. By adding additional bits or changing how the bits are used, instruction 800 can be configured for a processing element that supports more than four threads. Consider, for example, binary coding of depends bits 810–814, and tells bits 816–818. In such an example, depends bits 810–814 can represent up to eight other threads, extending instruction 800 to a processing element supporting nine threads. Similarly, additional depends and tells bits can be added as is necessary for a given processing element architecture.

Consider, for example, the case in which instruction 800 is executing in thread 1. If instruction 800 is executing in thread 1, the other three threads on which the execution of instruction 800 may depend are thread 0, thread 2, and thread 3. In this case, depends bit 810 can identify instruction 800 as dependent on thread 0, depends bit 812 can identify instruction 800 as dependent on thread 2, and depends bid 814 can identify instruction 800 as dependent on thread 3. Likewise, tells bit 816 can identify thread 0 as dependent on instruction 800. Tells bit 818 can identify thread 2 as dependent on instruction 800. Tells bit 820 can identify thread 3 as dependent on instruction 800.

As suggested by the relationships described above, dependency counter groups are a set of dependency counters associated with each thread. Each of threads 502–506 of instruction processing diagram 500, for example, would have, or be associated with, a dependency counter group. Each dependency counter group could include a number of individual dependency counters, each of which is associated with one of the other threads executing on the processing element. For example, the dependency counter group associated with thread 502 of instruction processing diagram 500 would include two dependency counters, one related to, or associated with, thread 504, and one related to, or associated with, thread 506.

Figure 7:
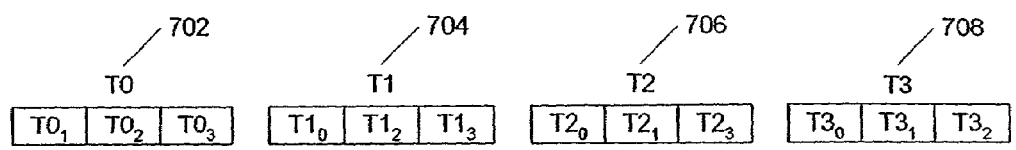
FIG. 7 illustrates dependency counter groups.

FIG. 7 illustrates exemplary dependency counter groups, according to an embodiment of the present invention. FIG. 7 shows four dependency counter groups, each of which is associated with one of four threads. Dependency counter group 702 (T0) is associated with thread 0, dependency counter group 704 (T1) is associated with thread 1, dependency counter group 706 (T2) is associated with thread 2, and dependency counter group 708 (T3) is associated with thread 3. Each of dependency counter groups 702–708 includes three dependency counters, each of which is associated with one of the other three threads. Dependency counter group 702 includes dependency counter $T0_1$, dependency counter $T0_2$, and dependency counter $T0_3$. Dependency counter $T0_1$ is that dependency counter of thread 0 that is related to, or associated with, thread 1. Similarly, dependency counter $T0_2$ and dependency counter $T0_3$ are thread 0 dependency counters associated with, or related to, threads 2 and 3, respectively. In the same manner, dependency counter group 704 includes dependency counter $T1_0$, dependency counter $T1_2$, and dependency counter $T1_3$. Dependency counter $T1_0$ is associated with thread 0, dependency counter $T1_2$ is associated with thread 2, and dependency counter $T1_3$ is associated with thread 3. Also, dependency counter group 706 includes dependency counter $T2_0$, dependency counter $T2_1$, and dependency counter $T2_3$. Dependency counter $T2_0$ is associated with thread 0, dependency counter $T2_1$ is associated with thread 1, and dependency counter $T1_3$ is associated with thread 3. Dependency counter group 708 includes dependency counter $T3_0$, dependency counter $T3_1$, and dependency counter $T3_2$. Dependency counter $T3_0$ is associated with thread 0, dependency counter $T3_1$ is associated with thread 1, and dependency counter $T3_2$ is associated with thread 2.

Note that although four dependency counter groups are shown (as are implemented in one embodiment to support four threads), and the dependency counter groups include three dependency counters each, other configurations are possible. For example, greater or fewer than four dependency counter groups can be used according to the number of threads a processing element can execute concurrently. Additionally, dependency counter groups 702–708 can include more or fewer dependency counters, depending on the processing element architecture.

Moreover, although the invention and illustrative examples are described in terms of dependency counter groups, and dependency counters, other configurations are possible. Consider, for example, bi-state, or tri-state elements substituted for dependency counters 702–708. A bi-state element associated with a first thread can be set when a corresponding dependee instruction in a second thread is executed, and reset when the dependent instruction is executed. In this example, a processing element suspends processing the first thread when it encounters an instruction including a depends bit if the bi-state element is not set. Similarly, tri-state elements, and other state retaining elements can be set and reset by the processing element. In this embodiment, however, care should be taken to avoid overflowing the state elements. For example, a bi-state element may be incremented, or changed, only once in response to an instruction that includes a tells bit.

Similarly, the implementation of the present invention should account for the size of the dependency counters to avoid overflow. Consider, for example, the case in which multiple instructions including tells bits identifying one thread are executed. In such a case, it is possible to overflow the dependency counter. Dependency counters, therefore, should be specified large enough to ensure that overflow will never occur, or limits should be set on the number of times a dependency counter can be incremented. For example, a first thread that includes many instructions that include tells bits identifying a second thread can be suspended once the dependency counter associated with the second thread has reached a limit. The limit can ensure that the dependency counter does not overflow, and can also ensure that a dependee thread does not get too far ahead of a dependent thread.

In operation, a tells bit affects one or more dependency counters of the threads other than the one on which the tells bit appears. By contrast, a depends bit affects one or more dependency counters of the thread on which the depends bit appears. Thus, when the processing element detects a first instruction in a first thread as including a tells bit that identifies a second thread, the processing element increments one of the dependency counters in the dependency counter group of the second thread. In particular, it increments that dependency counter of the second thread that is associated with the first thread. Consider, for example, the case in which thread 1 is executing a stream of instructions. One of the instructions in thread 1 includes a tells bit that identifies thread 0. In response to the tells bit, the processing element increments the particular dependency counter in dependency counter group 702 associated with thread 1. In the example of dependency counter group 702, dependency counter $T0_1$, is associated with thread 1. The processing element, therefore, increments $T0_1$ of dependency counter group 704 when the thread 1 instruction tells bit is detected. Similarly, when the processing element detects an instruction in a thread that includes a depends bit, the dependency counters are checked, and the processing element either suspends the dependent thread or executes the instruction and decrements the associated dependency counter.

For example, thread 1 can include an instruction that includes a depends bit that identifies the instruction as depending on the execution of thread 0. In this case, when the processing element detects the depends bit, the dependency counter associated with thread 0 of the dependency counter group associated with the thread 1 is checked. In this case, dependency counter $T1_0$ of dependency counter group 704 is associated with thread T0. Depending on the value of dependency counter $T1_0$, the processing element either suspends processing thread 1 or both decrements $T1_0$ and continues processing the thread 1, thereby executing the instruction. Once suspended, the processing element resumes processing thread 1 when dependency counter $T1_0$ is incremented by the processing element (i.e., when an instruction in thread 0 with a tells bit is executed).

Figure 6:
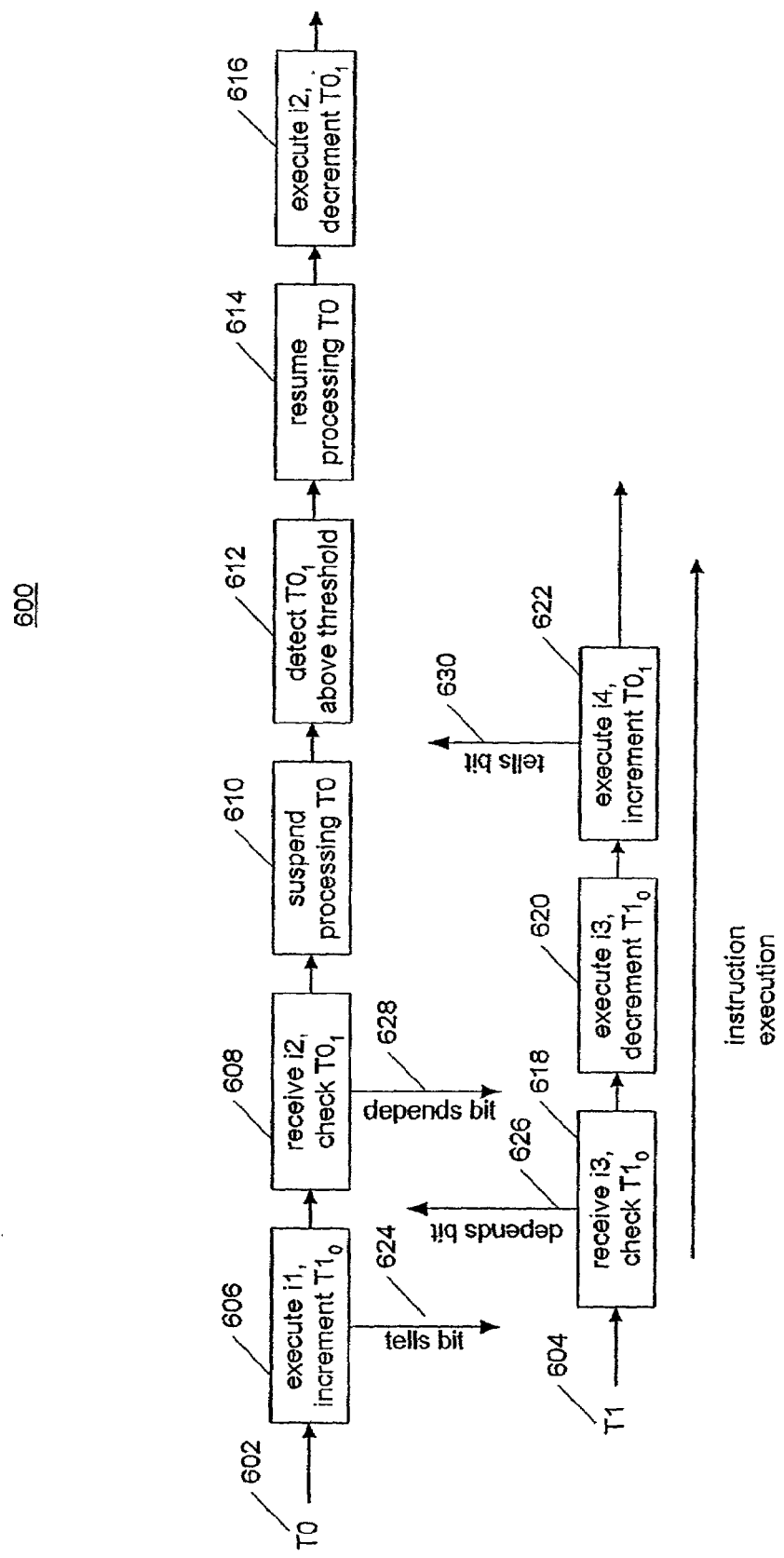
FIG. 6 illustrates concurrent processing of two threads of instructions.

FIG. 6 illustrates concurrent processing of two threads of instructions, according to an embodiment of the present invention. Thread synchronization diagram 600 shows thread 602 and thread 604 as a series of processing steps. A processing step is an action or actions performed by a processing element in the implementation of one embodiment of the present invention. A processing step can be, for example, the execution of an instruction, incrementing a dependency counter, decrementing a dependency counter, etc. Thread 602 includes processing step 606, processing step 608, processing step 610, processing step 612, processing step 614, and processing step 616. Thread 604 includes processing step 618, processing step 620, and processing step 622. Although synchronization diagram 600 only shows two threads of instructions, other configurations are possible. For example, the system and method of the present invention can be extended to three, four, and more than four threads, as described above.

For the purpose of descriptive clarity, the instructions of thread synchronization diagram 600 are referred to as instruction 508 (i1), instruction 510 (i2), instruction 512 (i3), and instruction 514 (i4). Note, however, that instruction processing diagram 500 shows instruction 512 as dependent on instruction 508, and shows instruction 510 as dependent on instruction 514. Thread synchronization diagram 600, on the other hand, shows the instructions of thread 602 dependent on the execution of instructions in thread 604 generally, and the instructions of thread 604 dependent on the execution of instructions in thread 602 generally. The dependencies between instructions 508–514 shown in instruction processing diagram 500 are implemented in the operation of one embodiment of the present invention through the general dependency of instructions within one thread on the processing of another thread (i.e., rather than particular instructions). This concept is illustrated in further detail below.

Additionally, thread synchronization diagram 600 shows tells bits 624 and 630 and depends bit 626 and 628 as arrows pointing from processing steps to the threads that the bits identify. The arrows are shown to indicate that an instruction being processed in a processing step includes a tells bit or depends bit, and identifies the thread to which the bit points. Either the thread pointed to depends on the instruction (i.e., tells bit), or the instruction depends on the thread (i.e., depends bit). For example, tells bit 624 identifies thread 604 as dependent on instruction 508 of processing step 606. Similarly, depends bit 626 identifies instruction 512 of processing step 618 as dependent on thread 602.

Processing of thread 602 and thread 604 begins when the processing element executes instruction 508, in processing step 606. Instruction 508 includes tells bit 624 that identifies thread 604 as dependent on instruction 508. The processing element detects tells bit 624 and increments a dependency counter in a dependency counter group 704 associated with thread T1, 604.

As described above, a dependency counter group is associated with a thread, and the dependency counter group includes dependency counters, each of which is associated with one of the other threads executing on the processing element. Thread synchronization diagram 600 is described in terms of dependency counter group 702 (associated with thread 602) and dependency counter group 704 (associated with thread 604). Dependency counter $T_{10}$ of dependency counter group 704 is associated with thread 602, and dependency counter T0, is associated with thread 602.

After processing step 606, the processing element receives instruction 512, in processing step 618. Instruction 512 includes depends bit 626 identifying instruction 512 as dependent on the execution of instructions in thread 602. The processing element determines if dependency counter $T1_0$ is above a predefined threshold. For the purposes of explanation, dependency counter $T1_0$ is assumed to have been above, or at the threshold, so that it is above the threshold after being incremented. Since the processing element has incremented dependency counter $T1_0$, when the dependency counter is checked in response to instruction 512, the processing element determines that dependency counter $T1_0$ is above the threshold.

Since dependency counter $T1_0$ is above the threshold, the processing element continues processing instruction 512, at processing step 620. In processing step 620, the processing element executes instruction 512 and decrements dependency counter $T1_0$.

Meanwhile, the processing element processes thread 602 in processing step 608. In processing step 608, the processing element receives instruction 510 from program memory. Instruction 510 includes depends bit 628, which identifies instruction 510 as dependent on the execution of instructions in thread 604. The processing element checks the dependency counter group of thread 602, particularly the dependency counter related to thread 604, in response to detecting depends bit 628. This corresponds to dependency counter $T0_1$. The value can be, for example, zero, or some other number representing a predetermined threshold. For exemplary purposes, however, dependency counter $T0_1$ is defined as having a value of the predetermined threshold. In any case, the value of dependency counter $T0_1$ indicates that instructions in thread 604 upon which instruction 510 depends, have not yet been executed. In response to detecting that dependency counter $T0_1$ is not above a threshold, the processing element suspends execution of thread 602 in processing step 610.

Meanwhile, the processing element continues processing thread 604. The processing element receives instruction 514 in processing step 622. Instruction 514 includes tells bit 630 that identifies thread 602 as including instructions dependent on instruction 514. The processing element increments that dependency counter of the thread 602 dependency counter group that is related to thread 604 (namely, dependency counter $T0_1$) in response to detecting tells bit 630, and executes instruction 514, in processing step 622. Note that the order of executing the instruction and incrementing or decrementing dependency counters is chosen for illustrative purposes only, and the same outcome can be achieved with reversed order.

After processing step 622, the processing element detects that dependency counter $T0_1$ has been incremented to above the threshold, in processing step 612. As such, the processing element resumes processing thread 602 at instruction 510 in processing step 614. After resuming processing thread 602, the processing element executes instruction 510, decrements dependency counter $T0_1$, and continues processing the instructions of thread 602, in step 616. Note that in the example of FIG. 6, dependency counter $T0_1$ is now equal to the threshold value, and any additional instructions in thread 602 that include depends bits identifying thread 604 will cause the processing element to suspend execution of the thread (absent prior instructions in thread 604 with tells bits identifying thread 602).

The operation of thread synchronization diagram 600 is now described with reference to the elements of exemplary processing element 400. The execution of thread 602 begins in processing step 606. For descriptive clarity, thread 602 is associated with instruction buffer 404A, and thread 604 is associated with instruction buffer 404B. In general, instruction fetch unit 402 fetches program instructions from program memory 306. Instruction fetch unit 402 distributes the instructions associated with the four threads to one of instruction buffers 404A, 404B, 404C, or 404D. In one embodiment, each of instruction buffers 404A–404D is associated with a particular thread.

Instruction issue control 408 detects the presence of depends bits such as depends bits 810–814 or the presence of tells bits, such as tells bits 816–820 included in instructions in instruction buffers 404A–404D. Based on presence or absence of depends bits and tells bits in the instruction, instruction issue control 408 controls function decode and execution switch 406. Based on signals from instruction issue control 408, function decode and execution switch 406 issues instructions from instruction buffers 404A–404D to one of execution units 412–416 (i.e., memory peripheral interface unit 412, primary function unit 414, or auxiliary function unit 416).

In processing step 606, instruction 508 is received in instruction buffer 404A. Instruction issue control 408 detects the presence of tells bit 624 in instruction 508. In response to detecting the presence of tells bit 624, instruction issue control increments one of the dependency counters in dependency counters 410. As described above, instruction issue control 408 increments dependency counter $T1_0$. Instruction issue control 408 then causes function decode and execution switch 406 to provide instruction 508 to one of execution units 412–416 for execution. Meanwhile, processing element 400 is also processing thread 604. Instruction buffer 404B receives instruction 512, in processing step 618. Instruction issue control 408 detects the existence of depends bit 626 in instruction 512. Depends bit 626 identifies instruction 512 as dependent on instructions in thread 602. In response to detecting depends bit 626, instruction issue control 408 checks dependency counter $T1_0$ in processing step 618. Since dependency counter $T1_0$ is above the threshold (as described above), instruction issue control 408 enables function decode and execution switch 406 to provide instruction 512 to one of execution units 412–416 for execution. Additionally, instruction issue control decrements dependency counter $T1_0$ in dependency counters 410.

Meanwhile, processing element 400 receives instruction 510 in processing step 608. Instruction issue control 408 detects the existence of depends bit 628 in instruction buffer 404A. Depends bit 628 identifies instruction 510 as dependent on instructions in thread 604. In response to detecting depends bit 628, instruction issue control 408 checks dependency counter $T0_1$ in dependency counters 410. In this particular example, dependency counter $T0_1$ is equal to the threshold necessary to continue processing instruction 510. Since dependency counter $T0_1$ is not above the threshold, instruction issue control 408 suspends execution of thread 602 by holding instruction 510 in function decode and execution switch 406.

Processing element 400 continues processing thread 604, and receives instruction 514 in processing step 622. Instruction 514 includes tells bit 630 identifying thread 602 as dependent on the execution of instruction 514. Instruction issue control 408 increments dependency counter $T0_1$ in response to detecting tells bit 630, in processing step 622. Instruction issue control 408 causes function decode and execution switch 406 to send instruction 514 to one of execution units 412–416 for execution. After dependency counter $T0_1$ has been incremented in processing step 622, instruction issue control 408 detects that dependency counter $T0_1$ has been incremented. Instruction issue control 408 checks dependency counter $T0_1$ to determine if it is above the threshold. In the example of thread synchronization diagram 600, instruction issue control 408 determines that dependency counter $T0_1$ is above the threshold, in processing step 612. In response to detecting dependency counter $T0_1$ above the threshold, instruction issue control 408 resumes processing thread 602 by issuing instruction 510 to one of execution units 412–416, in processing step 614. Instruction 510 is executed, and instruction issue control 408 decrements dependency counter $T0_1$ in processing step 616.

Figure 9:
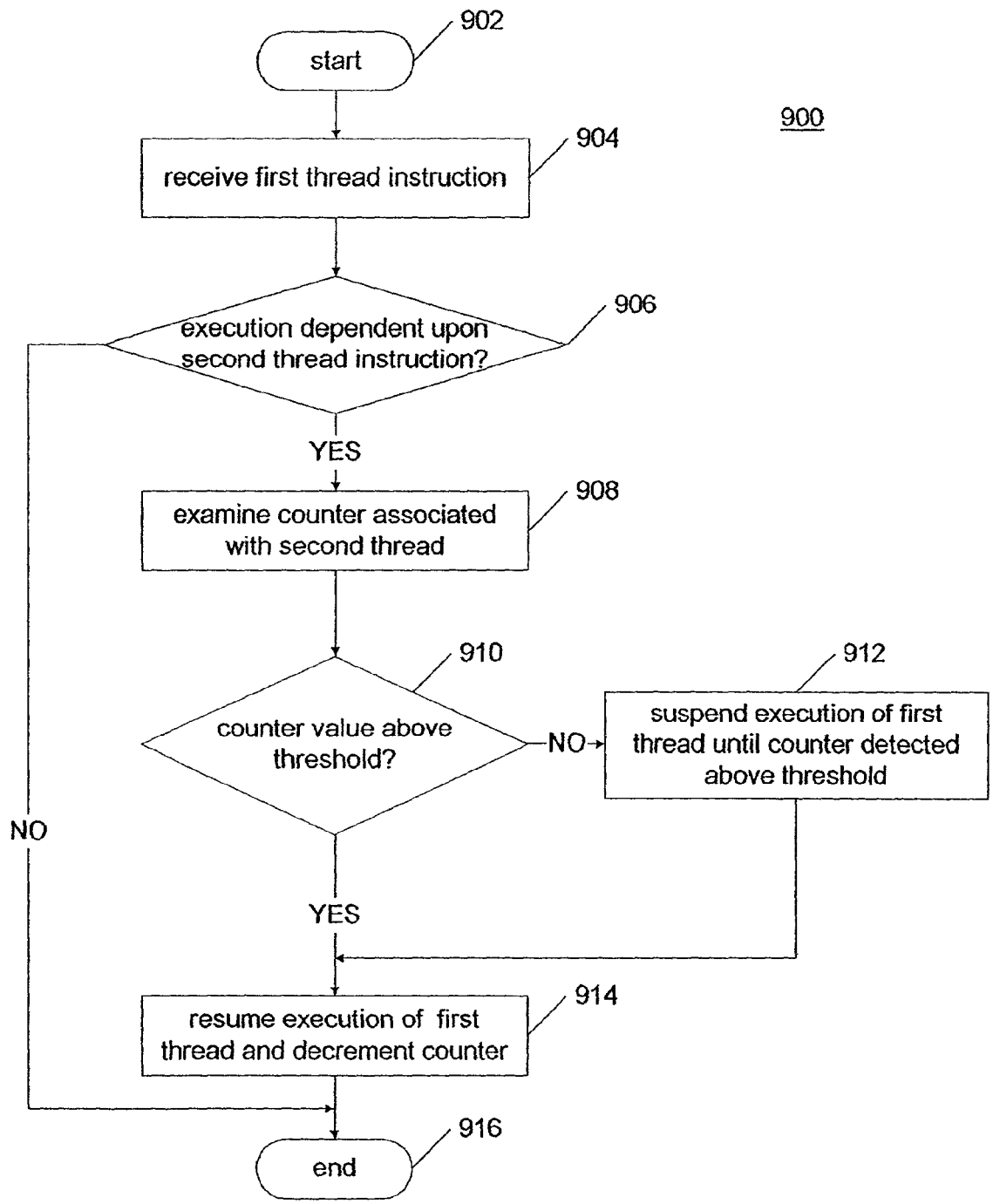
FIG. 9 illustrates an exemplary process for executing instructions.

FIG. 9 illustrates a process for executing instructions, according to an embodiment of the present invention. After method 900 starts in step 902, a processing element receives an instruction in a first thread, in step 904. In step 906, the processing element determines if the execution of the instruction in the first thread is dependent on the execution of instructions in a second thread.

If the processing element determines that the execution of the instruction in the first thread is not dependent on the execution of instructions in a second thread, method 900 ends in step 916.

If, on the other hand, the processing element determines that the execution of the instruction in the first thread is dependent on the execution of instructions in a second thread, the process of method 900 continues in step 908. In step 908, the processing element examines a dependency counter group that includes a dependency counter associated with the second thread.

In step 910, the processing element determines whether the dependency counter includes a value above a threshold. If the dependency counter includes a value above a threshold, method 900 continues in step 914. In step 914, the processing element executes the first thread instruction and decrements the dependency counter.

If, on the other hand, the processing element determines that the dependency counter does not include a value above a threshold, method 900 continues in step 912. In step 912, the processing element suspends execution of the first thread until the dependency counter is incremented to above a threshold. Once the dependency counter is incremented to above a threshold, processing the first thread resumes, method 900 continues in step 914. In step 914, the processing element executes the first thread instruction.

Figure 10:
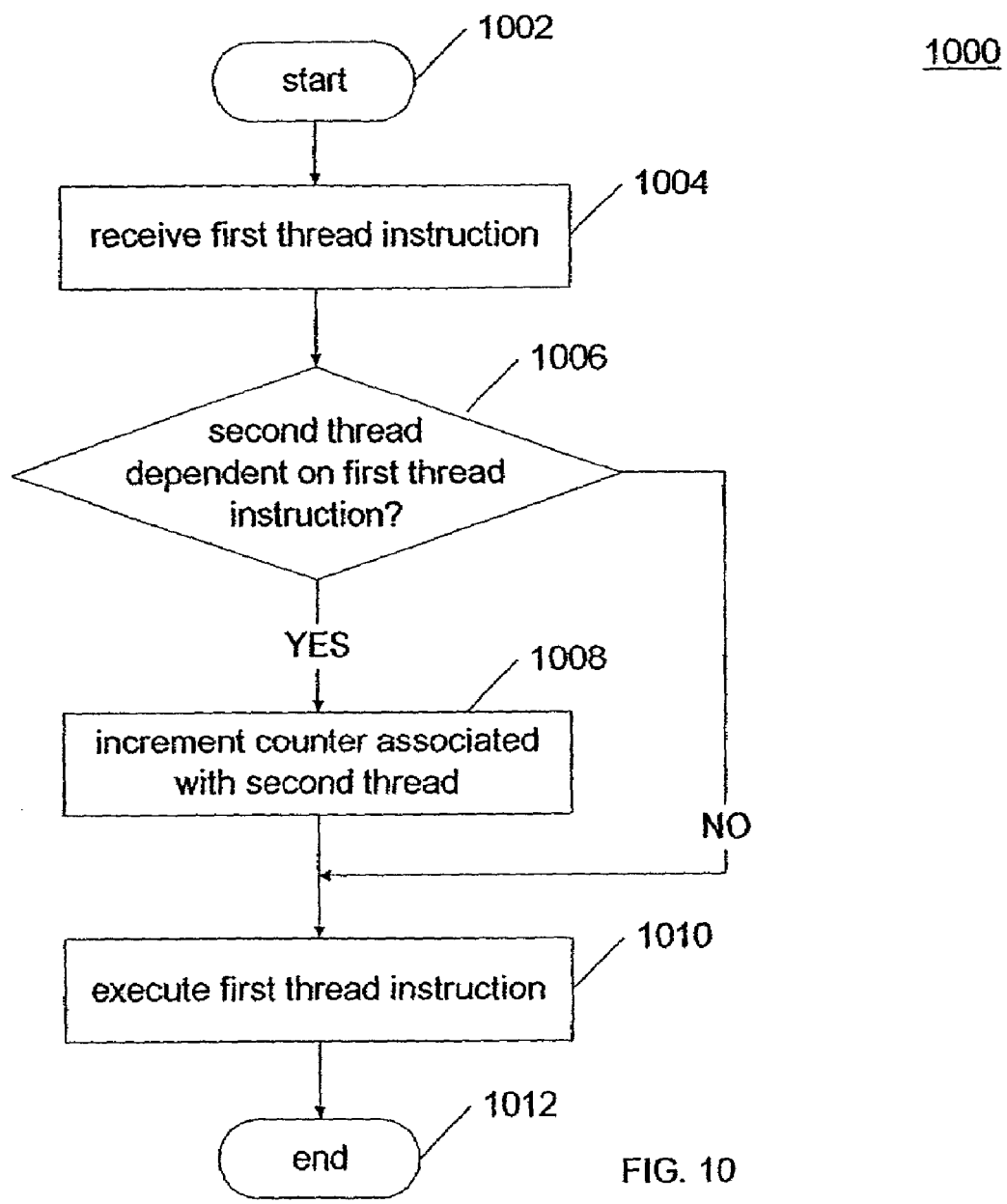
FIG. 10 illustrates an exemplary process for executing instructions

FIG. 10 illustrates an exemplary process for executing instructions, according to an embodiment of the present invention. After method 1000 starts in step 1002, a processing element receives a first thread instruction, in step 1004. After the first thread instruction has been received, the processing element determines whether a second thread is dependent on the first thread instruction, in step 1006.

If a second thread is dependent on the execution of the first thread instruction, method 1000 continues in step 1008. In step 1008, the processing element increments a dependency counter included in a dependency counter group associated with the second thread. After the dependency counter is incremented, the processing element executes the first thread instruction, in step 1010.

If, on the other hand, the processing element determines that a second thread is not dependent on the first thread instruction, the process of method 1000 continues in step 1010. In step 1010, the processing element executes the first thread instruction.

After step 1010, method 1000 ends in step 1012.

The present invention provides a system and method for high speed processing of network data elements. A network line module, such as network line module 104₁, receives network data elements from a network or switch fabric via a network line module ingress port. The network line module provides the network data elements to a multiprocessor core. The received network data elements are distributed to multiple processing elements within the multiprocessor core for processing according to a program.

The processing elements process the network data elements according to program instructions stored in program memory. Each of the processing elements uses instruction-level parallelism to process multiple threads of instructions concurrently. Instruction execution is synchronized by recording dependencies between instructions and threads. Instructions in the threads can include dependence indicators identifying dependencies between instructions and threads. When a processing element encounters an instruction that includes dependence indicators identifying a dependent instruction or thread, the processing element checks, decrements, or increments one or more dependency counters that records dependency between instructions and threads. If an instruction in a first thread is dependent upon the execution of instructions in a second thread, a dependency counter is checked. If the dependency counter is not above a predetermined threshold, the processing element suspends the execution of the first thread until the dependency counter is incremented by the second thread to above the threshold.

After processing, the multiprocessor core provides processed network data elements to the network line module. The network line module provides the processed network data element to an egress port connected to a network or switch fabric.

It will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An apparatus for instruction-level parallelism in a processing element, comprising:
    an instruction control unit;
    a first instruction buffer coupled to said instruction control unit, the first instruction buffer configured to hold a first instruction including a dependency indicator and being associated with a first thread;
    a second instruction buffer coupled to said instruction control unit, the second instruction buffer configured to hold a second instruction including a dependency indicator and being associated with a second thread;
    a dependency counter coupled to said instruction control unit;
    an execution switch coupled to said instruction control unit, said first instruction buffer, and said second instruction buffer; and
    an execution unit coupled to said execution switch;
    said instruction control unit configured to detect the dependency indicators and change the value of said dependency counter in response to detecting the dependency indicators and configured to disallow execution of the first instruction if said dependency counter includes a value less than a threshold value.

2. The apparatus of claim 1, wherein said dependency counter includes a first counter associated with the first instruction buffer and a second counter associated with the second instruction buffer.

3. The apparatus of claim 1, wherein said instruction control unit identifies instruction dependency bits in said first instruction buffer, the instruction dependency bits being associated with instructions.

4. The apparatus of claim 1, said instruction control unit generating control signals based on the dependency bits and values included in said dependency counter.

5. The apparatus of claim 4, said execution switch providing instructions from said first instruction buffer to said execution unit based on control signals from said instruction control unit.

6. The apparatus of claim 1, said execution switch providing instructions from said first instruction buffer to said execution unit based on control signals from said instruction control unit.

7. An apparatus for processing instructions in multiple threads in an execution unit, comprising:
    an instruction buffer holding a first instruction and a second instruction, the first instruction being associated with a first thread, and the second instruction being associated with a second thread, the first instruction and the second instruction including one or more instruction dependency bits;
    a dependency counter,
    an instruction control unit coupled to said instruction buffer and said dependency counter, said instruction control unit detecting the instruction dependency bits and incrementing and decrementing said dependency counter in response to detecting the instruction dependence bits, said instruction control unit configured to disallow execution of the first instruction if said dependency counter includes a value less than a threshold value; and an execution switch coupled to said instruction control unit and said instruction buffer, said execution switch sending instructions to the execution unit.

8. The apparatus of claim 7, wherein said dependency counter includes a first counter associated with the first thread and a second counter associated with the second thread.

9. The apparatus of claim 7, wherein said instruction buffer includes the instruction dependency bits, the instruction dependency bits being associated with instructions.

10. The apparatus of claim 7, wherein said instruction control detects dependency between the first instruction and the second thread based on dependency bits in said instruction buffer and a value of said dependency counter.

11. A method for processing instructions in multiple threads, comprising:
receiving a first instruction associated with a first thread;
determining whether execution of the first instruction depends on execution of a second instruction, the second instruction being associated with a second thread;
examining a counter associated with the first thread if said determining indicates that the first instruction depends on the execution of the second instruction;
decrementing the counter if said examining indicates that the second instruction has already been executed; and
executing the first instruction.

12. The method of claim 11, further comprising suspending the processing of the first thread until said examining indicates that the second instruction has already been executed.

13. A method for processing instructions in multiple threads, comprising:
receiving a first instruction associated with a first thread;
determining whether execution of a second instruction depends on the execution of the first instruction, the second instruction being associated with a second thread;
incrementing a counter associated with the second thread if said determining indicates that execution of a second instruction depends on the execution of the first instruction; and
executing the first instruction.

14. The method of claim 13, further comprising suspending the processing of the second thread if the counter associated with the second thread does not exceed a threshold.

15. A method for processing instructions in multiple threads, comprising:
receiving a first instruction associated with a first thread;
determining whether a second thread depends on said first instruction;
incrementing a counter associated with the second thread if the second thread depends on said first instruction;
loading a second instruction associated with a second thread; and
processing the second instruction in a manner related to the value of the counter associated with the second thread.

16. The method of claim 15, further comprising suspending the processing the second thread if the counter indicates that a dependent thread has not been executed.

17. The method of claim 15, further comprising executing the second instruction if the counter indicates that said first instruction has been executed.

18. An apparatus for processing instructions in multiple threads, comprising:
an instruction buffer configured to hold a first instruction and a second instruction, the first instruction including a dependency indicator and being associated with a first thread, and the second instruction including a dependency indicator and being associated with a second thread;
an instruction control unit coupled to said instruction buffer;
a dependency counter coupled to said instruction control unit, said dependency counter associated with the first thread;
said instruction control unit configured to detect the dependency indicators and change the value of said dependency counter in response to detecting the dependency indicators; and
said instruction control unit configured to disallow execution of the first instruction if said dependency counter includes a value less than a threshold value.

19. The apparatus of claim 18, wherein said instruction control unit is configured to determine that the dependency indicator included in the first instruction indicates that the second thread includes an instruction on which the first instruction depends.

20. The apparatus of claim 18, wherein the dependency indicator included in the first instruction is a depends bit.

21. The apparatus of claim 18, wherein said instruction control unit is configured to determine that the dependency indicator included in the second instruction indicates that the first thread includes an instruction that is dependent on the second instruction.

22. The apparatus of claim 18, wherein the dependency indicator included in the second instruction is a tells bit.

23. The apparatus of claim 18, wherein said instruction control unit is configured to increment said dependency counter in response to detecting the dependency indicator included in the second instruction.

24. The apparatus of claim 18, wherein said instruction control unit is configured to decrement said dependency counter in response to detecting the dependency indicator included in the first instruction.

* * * * *